United States Patent [19]
Shuster et al.

[11] Patent Number: 5,652,068
[45] Date of Patent: Jul. 29, 1997

[54] METAL-AIR BATTERY WITH IMPROVED AIR SUPPLY

[75] Inventors: Nicholas Shuster, Madison; David E. Harney, Twinsburg, both of Ohio

[73] Assignee: Northrop Grumman Corporation, Los Angeles, Calif.

[21] Appl. No.: 557,439

[22] Filed: Nov. 14, 1995

[51] Int. Cl.$^6$ .......................... H01M 12/06; H01M 8/04
[52] U.S. Cl. .................................. 429/27; 429/34
[58] Field of Search .......................... 429/27, 34

[56] References Cited

U.S. PATENT DOCUMENTS 5,190,833  3/1993  Goldstein et al. .................. 429/27
5,387,477  2/1995  Chelky .............................. 429/34

*Primary Examiner*—John S. Maples
*Attorney, Agent, or Firm*—Walter G. Sutcliff

[57] ABSTRACT

A metal-air battery having a case within which is contained an anode, an air cathode and a liquid electrolyte, above which is an air plenum. The battery includes a standpipe arrangement which extends to a source of air for providing the necessary oxygen to the air plenum for proper battery operation.

3 Claims, 5 Drawing Sheets

METAL-AIR BATTERY WITH IMPROVED AIR SUPPLY

BACKGROUND OF THE INVENTION

1. Field of the Invention

This invention in general relates to electrochemical cells, and more particularly to a long-life, metal-air battery which may be placed in a concealed location.

2. Description of Related Art

Metal-air batteries are typically used to provide power for long, unattended operating periods such as may be required for railroad signaling devices and channel buoys, by way of example. These batteries use oxygen from the air to generate electrical energy and must be continuously supplied with fresh air to function. If these batteries are utilized in a location which lacks sufficient oxygen for operation, polarization, i.e., loss of voltage, could result and ultimately lead to complete battery failure.

The present invention provides an arrangement whereby a metal-air battery may be used in a hidden location such as underwater or in the earth, while still maintaining proper operation with an adequate supply of air.

SUMMARY OF THE INVENTION

A metal-air battery is provided for unattended use at a first location which lacks sufficient air for proper operation. The arrangement includes a battery case containing an anode, an air cathode and an electrolyte solution. The interior of the case is arranged such that there is an air chamber in contact with the air cathode. At least one standpipe is provided which connects the air chamber with a source of oxygen at a second location displaced from the first location.

In one embodiment, the standpipe includes first and second elongated pipes of different diameters with the larger diameter pipe being concentric with the smaller diameter pipe. When the exterior pipe is heated such as from the sun, the thermal difference between the inner and outer pipes sets up a convection current whereby fresh air from the second location is provided to the air chamber.

DESCRIPTION OF THE PREFERRED EMBODIMENTS

Figure 1:
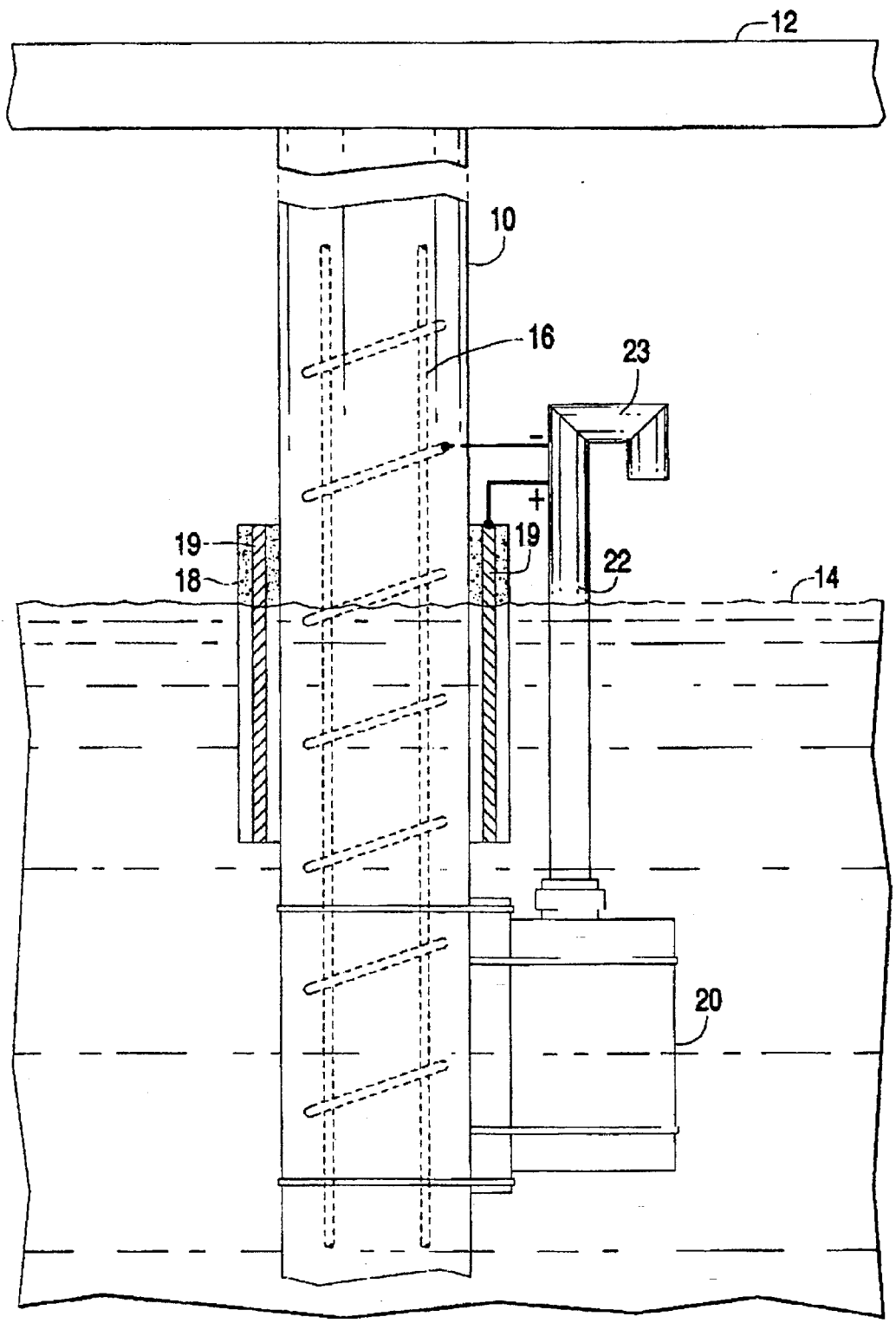
FIG. 1 illustrates an environment in which the present invention may be utilized.

FIG. 1 illustrates one embodiment of the present invention for use of a metal-air battery in a remote cathodic protection installation for bridges and marine structures constructed of steel reinforced concrete.

In FIG. 1 a concrete piling 10 supports a road deck 12 over a body of saltwater 14. The reinforcing bars 16 in the concrete pilings are attacked by the combination of air and saltwater, eventually resulting in spauling of the concrete and exposure of the reinforcing bars. The situation manifests itself in a splash zone which is the region between low-tide water level and approximately three feet above high-tide water level. To prevent this action, a cathodic protection arrangement may be utilized.

In one type of cathodic protection arrangement, an appropriate voltage is applied between the reinforcing bar 16 and an inert anode positioned within a jacket 18 in the splash zone. The anode 19 is connected to the positive element of a metal-air battery 20 shown affixed to piling 10 in the water below the splash zone, while the reinforcing bars 16 are connected to the negative element of the battery. The metal-air battery 20 is in a location which lacks sufficient air for proper operation, and accordingly, air for the metal-air battery 20 is supplied from a second location above the water level via a standpipe 22 having means in the form of a U-shaped section 23 at the upper end thereof to prevent the elements (such as rain, snow, sleet), and debris, from falling into the battery 20.

Figure 2:
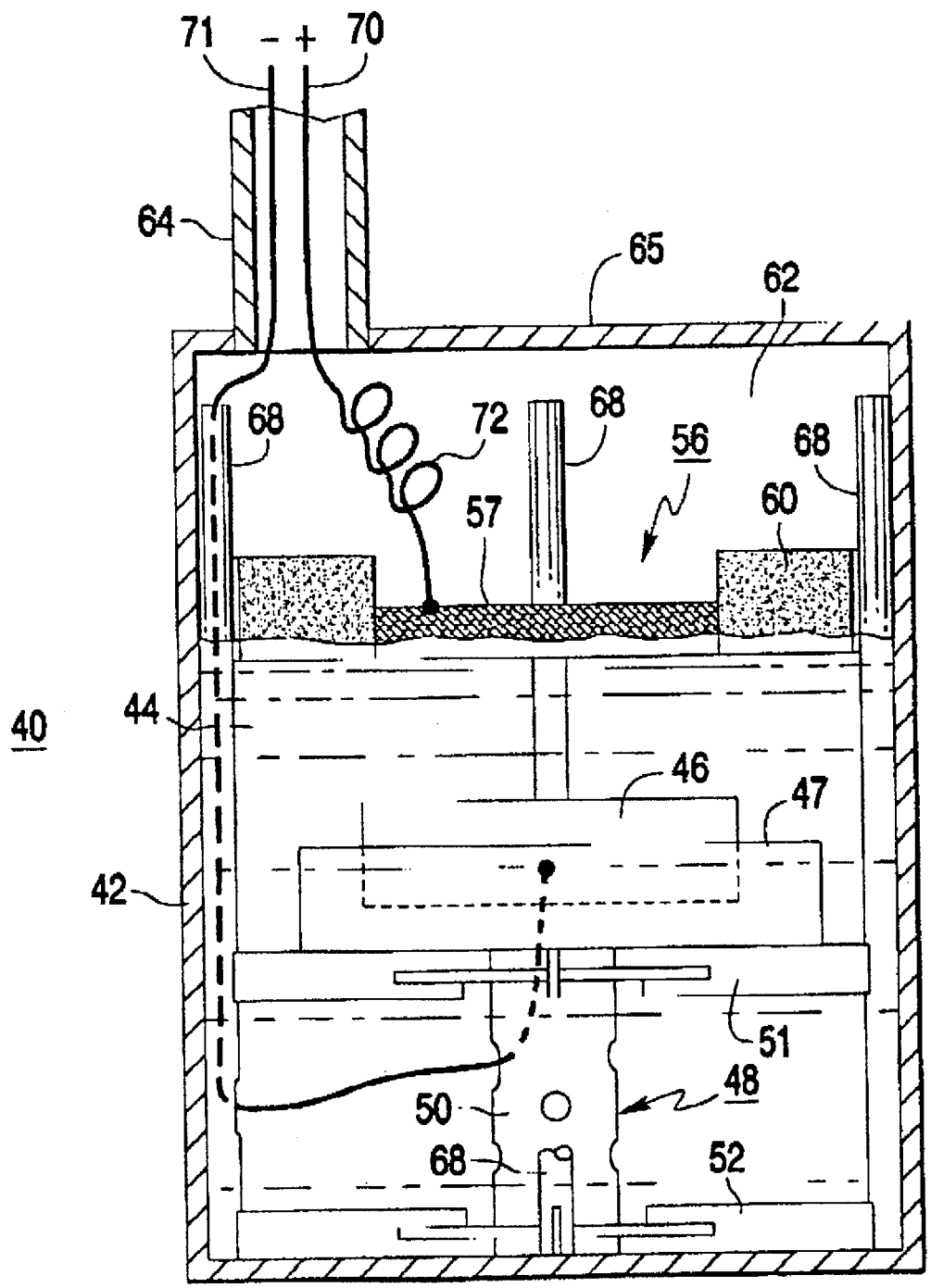
FIG. 2 is a simplified presentation of one embodiment of a metal-air battery which may be used in conjunction with the present invention.
Figure 3:
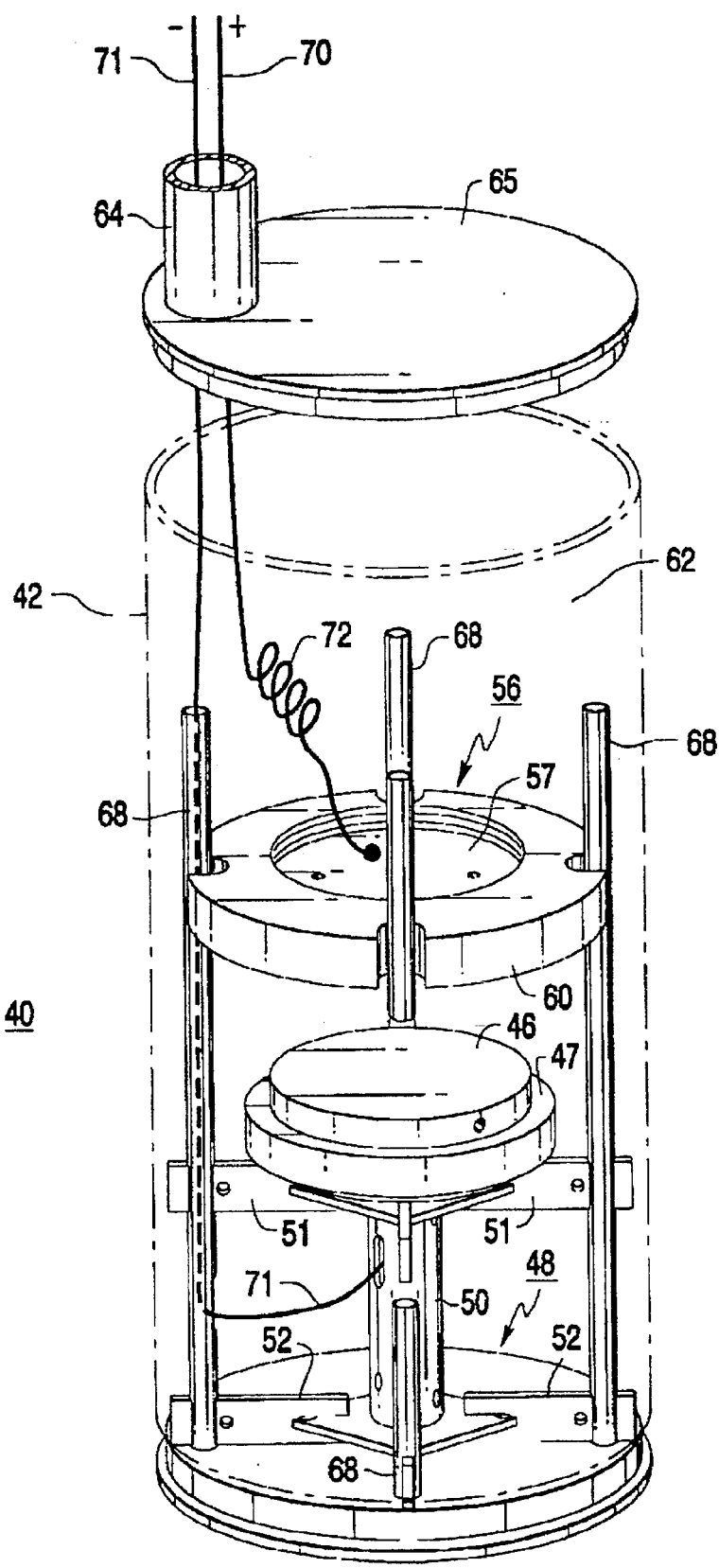
FIG. 3 is a pictorial view of the battery of FIG. 2.

FIGS. 2 and 3 illustrate an improved metal-air battery 40 incorporating the present invention. Battery 40 includes a case 42 (shown in phantom line in FIG. 3) partially filled with an electrolyte 44 such as a potassium hydroxide solution which is stable over a wide range of temperatures and will not freeze until the ambient temperature drops below $-40°$ F.

The battery includes an anode 46 such as of zinc and contained within an anode holder 47 such that only a portion of the anode surface is exposed to the electrolyte 44. The anode is completely emersed in the electrolyte 44 and is held in position by means of a support structure.

One example of a support structure, 48, includes an apertured vertical support tube 50 affixed to the underside of anode holder 47 and to which is connected upper and lower laterally extending arms 51 and 52.

The battery includes an air cathode arrangement 56 at the surface of the electrolyte positioned such that a portion of the cathode is within the electrolyte and the remainder is above the surface. Cathode arrangement 56 includes cathode 57 which is a rigid, rugged, reticulated foam structure which may be 0.5 inches thick and coated with a catalytic layer of silver or similarly effective oxygen reduction catalyst. One type of reticulated structure which may be used is a commercially available metallic foam such as nickel foam, and having a porosity of approximately 40–45 pores per inch. Such structure can be cut into circles, squares or any geometric shape.

In the battery illustrated, the air cathode 57 is horizontally disposed and floats at the surface of the electrolyte 44. This is accomplished by means of a float collar in the form of a float ring 60 of a material such as a closed cell polyolefin with the arrangement being sized to cover substantially all of the electrolyte surface. Such arrangement prevents needless evaporation and contributes to long life. As the electrolyte level in the battery drops due to consumption of water, the float ring simply tracks the change in liquid level and continuously maintains the required interface whereby the cathode 57 is in contact with the liquid electrolyte 44 as well as air supplied to chamber 62 from a location remote from the battery, by means of at least one standpipe 64 connected to the top 65 of case 42.

As an alternative to the floating cathode arrangement, a stationary horizontal cathode may be supported in place at the electrolyte surface and would be of a thickness to accommodate changes in electrolyte level.

The tracking of the liquid level by means of float ring 60 is aided with the provision of a plurality of guides in the form of vertical rods 68 which may be held in position by the upper and lower laterally extending support arms 51 and 52.

Suitable electrical connection is made to the electrodes by means of positive and negative electrical leads 70 and 71 connected respectively to the cathode 57 and anode 46. In order to accommodate for vertical movement of the cathode arrangement 56, the positive electrical lead 70 may be provided with a plurality of loops 72. The negative lead 71 may be connected to the underside of cathode 46 via apertured vertical support tube 50.

The battery 40 is more fully described and claimed in copending applications Ser. No. 08/577,440 filed Nov. 14, 1995 (WE 58,674) and Ser. No. 08/557,441 filed Nov. 14,1995 (WE 58,675) and assigned to the same assignee as the present invention.

The air cathode makes use of the oxygen from the atmosphere as one of the reactants. The reaction which occurs at the air cathode is:

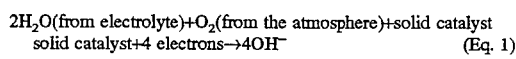

$$2H_2O(\text{from electrolyte}) + O_2(\text{from the atmosphere}) + \text{solid catalyst}$$
$$\text{solid catalyst} + 4 \text{ electrons} \rightarrow 4OH^- \quad \text{(Eq. 1)}$$

Figure 4:
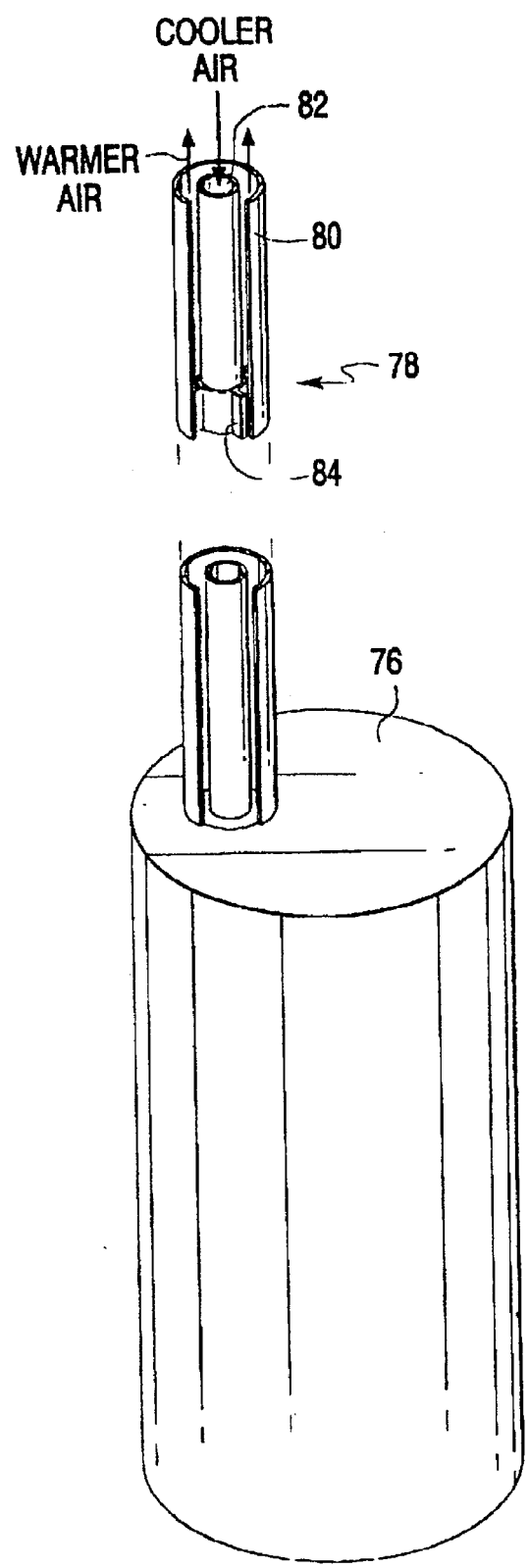
FIG. 4 is a view of a preferred embodiment of a standpipe in accordance with the present invention, utilized in conjunction with the battery.

From the above, oxygen from the atmosphere is reduced in the presence of water from the electrolyte and a catalyst, to form hydroxyl ions. Since oxygen is consumed as the battery is discharged, a continuous supply of air is needed to keep the battery operating. In order to prevent oxygen starvation at the air-cathode, a standpipe design may provide four times the stoichiometric volume of air required per Equation (1). If the battery is mounted at a first location underwater in a cathodic protection arrangement or buried in the earth for other uses, air is supplied from a second location by means of the standpipe 64 which serves as a snorkel or breather tube. As oxygen is consumed it is replaced by convection of fresh air down the standpipe. Several factors influence the rate of replenishment of the oxygen and include the length and diameter of the pipe, temperature variations down the length of the pipe and wind velocity. FIG. 4 illustrates an arrangement for supplying required air to the battery used in warm weather climates.

The metal-air battery 76 of FIG. 4 includes a standpipe 78 which will provide sufficient air so that battery performance is not degraded. If the battery 76 is in a relatively cool position such as underwater, the exposed portion of the standpipe may be exposed to the hot sun resulting in a possible thermal blockage and a consequent reduced air flow. Standpipe 78 obviates this by its construction including a larger diameter outer pipe 80 as well as a smaller diameter inner pipe 82 coaxial therewith and maintained in position by means of one or more spiders 84. The thus formed double walled pipe creates a convective circulation, as illustrated by the arrows in FIG. 4, by means of the temperature difference between the two pipe walls. Cooler air is denser and sinks relative to hotter air which rises. This differential temperature effect creates turbulence and movement of the air within the standpipe 78 whereby fresh air becomes mixed with the air in the standpipe and oxygen is sufficiently replenished.

Figure 5:
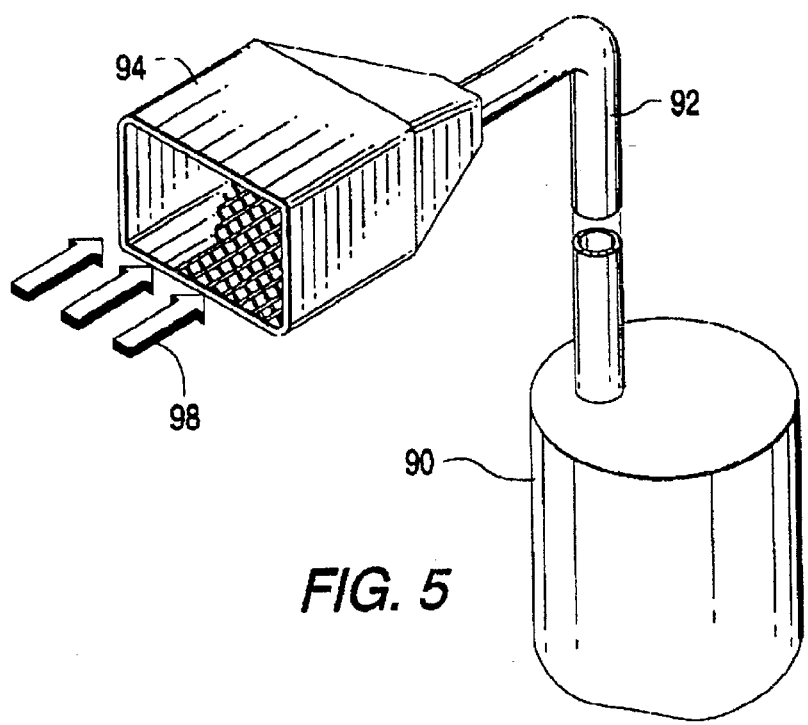
FIGS. 5 and 6 illustrate an arrangement for supplying the battery with air in a windy environment.
Figure 6:
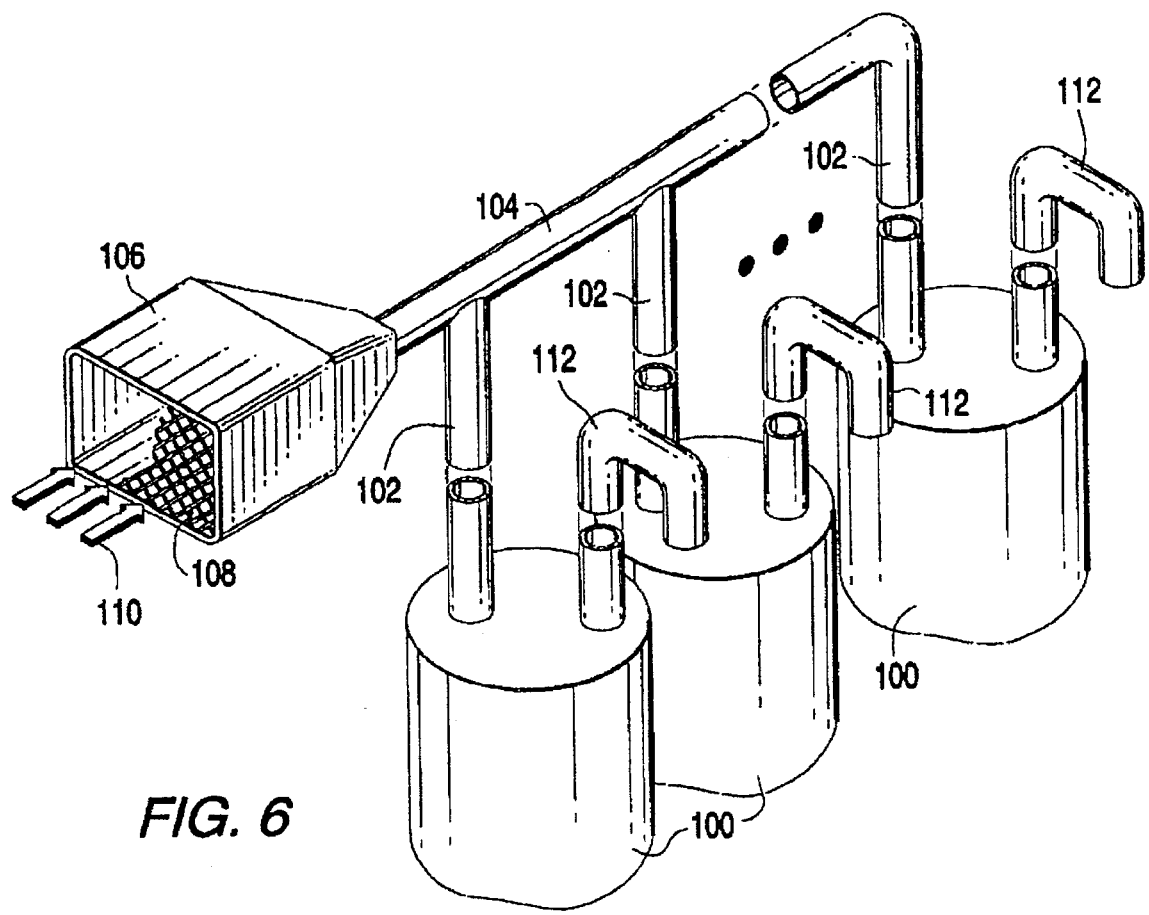

FIG. 5 illustrates an arrangement for supplying sufficient oxygen to a metal-air battery 90 wherein the apparatus is located in a high wind velocity area. A standpipe 92 for the battery 90 is connected to an enlarged air scoop or plenum 94 protected by screening 96 and oriented in the path of expected high winds as indicated by arrows 98.

Where a plurality of metal-air batteries is utilized such as depicted by metal-air batteries 100 in FIG. 6, the standpipes 102 from these batteries may be connected to a manifold 104 which is connected to an air scoop or plenum 106 having protective screening 108 positioned in the path of high wind velocity as indicated by arrows 110. In order to provide for increased air circulation in the manifold arrangement, an additional standpipe 112 may be connected to each battery 100.

What is claimed is:

1. A metal-air battery for unattended use in a first location which lacks sufficient air for proper operation, comprising:
   a) a battery case;
   b) an anode, an air cathode and an electrolyte contained within said case;
   c) said case including an air chamber in contact with said air cathode;
   d) a standpipe arrangement having at least one standpipe connecting said air chamber with a source of oxygen at a second location displaced from said first location;
   e) said second location being outdoors and said standpipe having a U-shaped segment connected to the end of said standpipe at said second location to prevent weather elements from entering said battery through said standpipe.

2. A metal-air battery for unattended use in a first location which lacks sufficient air for proper operation, comprising:
   a) a battery case;
   b) an anode, an air cathode and an electrolyte contained within said case;
   c) said case including an air chamber in contact with said air cathode;
   d) a standpipe arrangement having at least one standpipe connecting said air chamber with a source of oxygen at a second location displaced from said first location; and wherein
   e) said standpipe arrangement includes first and second standpipes having different diameters and being concentrically arranged.

3. A metal-air battery for unattended use in a first location which lacks sufficient air for proper operation, comprising:
   a) a battery case;
   b) an anode, an air cathode and an electrolyte contained within said case;
   c) said case including an air chamber in contact with said air cathode;
   d) a standpipe arrangement having at least one standpipe connecting said air chamber with a source of oxygen at a second location displaced from said first location; and wherein
   e) said case is a waterproof case; and
   f) said first location is underwater.

* * * * *